United States Patent

[11] 3,533,326

| [72] | Inventor | Raymond Naville<br>Nidau, Switzerland |
|---|---|---|
| [21] | Appl. No. | 734,783 |
| [22] | Filed | June 5, 1968 |
| [45] | Patented | Oct. 13, 1970 |
| [73] | Assignee | Fabriques de Machines Mikron S.A.<br>Biel, Bern, Switzerland |
| [32] | Priority | Mar. 28, 1968 |
| [33] | | Switzerland |
| [31] | | 4,635/68 |

[54] GEAR HOBBING MACHINE
8 Claims, 3 Drawing Figs.

[52] U.S. Cl. ................................................. 90/4,
318/39, 318/44, 318/72, 318/320
[51] Int. Cl. ................................................. B23f 5/20

[50] Field of Search........................................... 90/3, 4;
318/39, 44, 320

[56] References Cited
UNITED STATES PATENTS

| 2,885,615 | 5/1959 | De La Brentoniere....... | 318/44 |
|---|---|---|---|
| 3,232,170 | 2/1966 | Findley......................... | 318/39X |
| 3,254,566 | 6/1966 | Bradner........................ | 90/4 |
| 3,267,344 | 8/1966 | McDaniel..................... | 318/39 |

Primary Examiner—Gil Weidenfeld
Attorney—Imirie, Smiley, Snyder and Butrum

ABSTRACT: This invention relates to a gear hobbing machine wherein the hob arbor and the work arbor are synchronized by means of an electrical synchronizing transmission comprising a pair of three-phase slipring motors having each a first winding connected to the mains and a second winding connected to the second winding of the other slipring motor.

Patented Oct. 13, 1970

INVENTOR
RAYMOND NAVILLE

ATTYS.

INVENTOR
RAYMOND NAVILLE

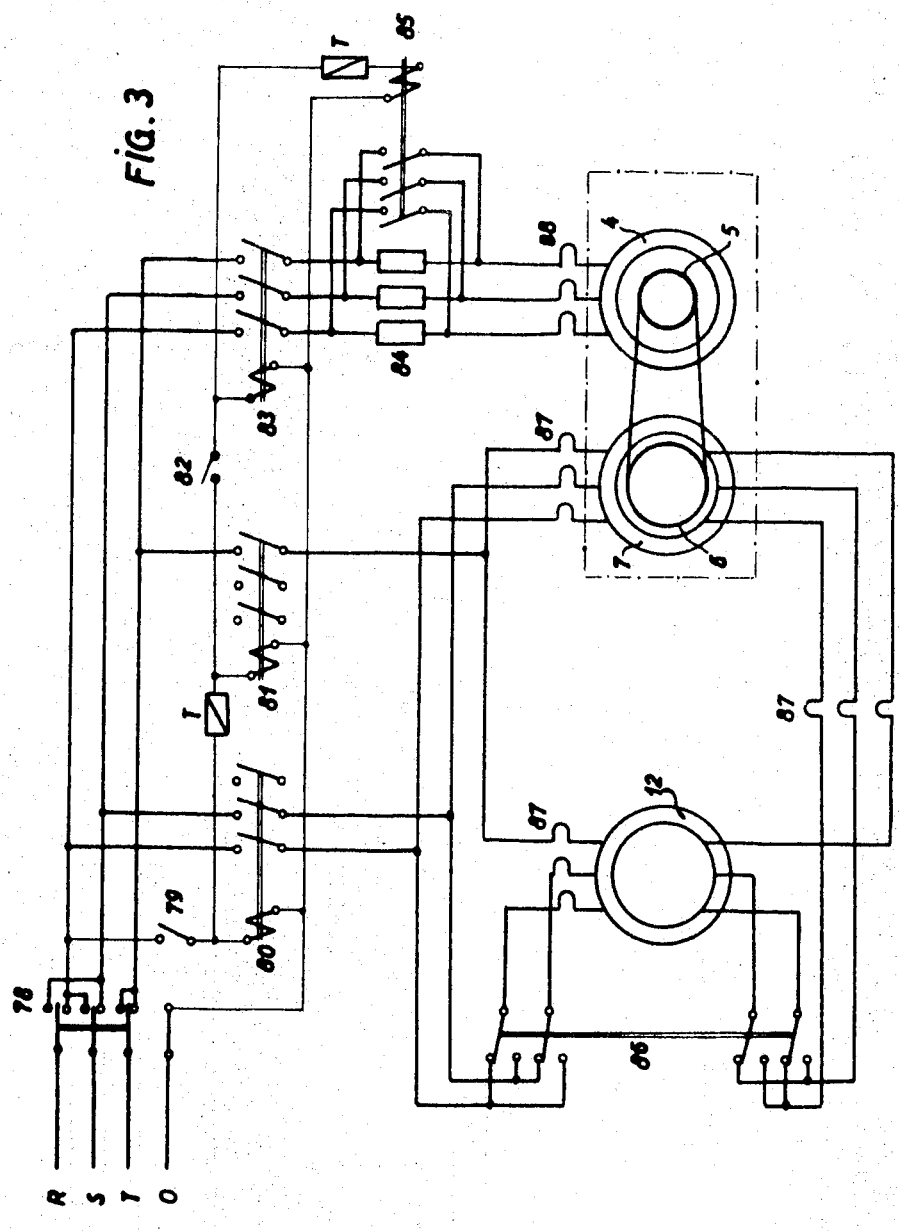

GEAR HOBBING MACHINE

This invention relates to a gear hobbing machine for cutting gears in accordance with the hob milling or self-generating method.

It is a basic condition in machines of this type to strictly maintain a constant ratio between the speed of the tool or hob arbor and the workpiece to be cut. This ratio is adjusted in accordance with the number of teeth to be cut, but during the machining of a gear this ratio must remain absolutely constant. The movement of the cutter must thus be kept in a constant ratio to the movement of the workpiece not only for one revolution of the cutter but during this revolution.

For hobbing a gear of a predetermined diameter and length, the hob must further be displaced in radial and longitudinal direction relatively to the axis of the workpiece. For hobbing helical gears the hob has to be inclined according to the angle of the helical gear to be cut in addition to the adjustment of the relation between the number of teeth and the feeding movements, in order to obtain the correct shape of the profile.

In practice, all gear hobbing machines include a mechanical transmission between the hob arbor and the work arbor. This transmission should be of very high precision in order to warrant an absolute continuity of the speed ratio. Since the hob must be displaced in at least three directions, namely in radial direction and axial direction and in accordance with the angle of helical gears to be produced, the mechanical constructions are often complicated and require splined shafts of high precision, bevel gears in different places or cardan transmissions for small gears. The required precision is not always obtained with these various elements due to difficulties of manufacture, due to the forces of cutting and flexure, to friction, wear and so on.

Gear grinding machines are known in the art, wherein the movements of the grinding disc or discs and the workpiece are synchronized by means of an electrical transmission, comprising single-phase selsyn systems or a more complicated system of two synchronous motors. In these grinding machines a continuous machining with substantially constant cutting forces is involved.

Another system has been suggested comprising an electrical governing circuit for synchronous control of two motors whereof the one drives the hob and the other drives the workpiece in a gear hobbing machine. This system is extremely complicated and expensive and requires a high number of high-precision elements which are difficult to produce, for example gear boxes, speed indicators and the like.

This invention aims in providing a novel synchronizing system which is simply more reliable, cheaper and warrants high precision for gear hobbing machines, that is machines with intermittantly cutting tools. The gear hobbing machine according to this invention includes an electrical synchronizing transmission between the hob arbor and the gear mechanism of the work arbor, said transmission comprising two three-phase slipring motors, having each a first three-phase winding adapted to be connected to the three-phase mains for producing a field rotating in a predetermined direction, second windings of each of said slipring motors being electrically connected to each other, driving motor means for driving at least one of said slipring motors and adapted to deliver the driving power for the machine, said slipring motors being driven by said driving motor means in a direction opposite to the rotating direction of said field and are synchronized by said electrically interconnected second windings. In this way it is possible to select any desired driving speed with a sufficiently high pullout torque of the electric synchronizing transmission.

Preferably, the driving motor is directly coupled to the one motor of the electrical transmission and to the cutter for machining the workpiece, this cutter consuming the majority of the required power. Since the power to be transmitted through the electrical transmission for driving the workpiece is relatively small, accordingly small and cheap slipring motors may be used in this transmission.

Besides the substantial simplification of the mechanical part of the machine and the absence of elements difficult to be produced and maintained with the required precision, the accuracy of the machining substantially exceeds the accuracy of classical machines due to the reduction of the number of gears, the reduction of the elasticity of kinetic chains and to the inertia of the rotor of the slipring motor coupled to the cutter, by which the vibrations of the cutter are damped. Experiments have shown that the errors of division of a gear may substantially be reduced with the electrical synchronizing system according to this invention.

Further a hob used in a machine according to this invention is subject to extremely small wear as compared with a similar hob for the similar operation used in a classical machine. The precision is practically independent of the cutting force and of the cutting speed. On the other hand it is possible to place the hob in any desire position without worrying about its driving mechanism.

The machining of helical gears usually requires the use of a differential gear train adapted to accelerate or decelerate the dividing or indexing. In the machine according to this invention it is feasible to replace the mechanical differential gear train of classical machines by rotation in the one or other direction of a rotatable stator of one of the slipring motors in order to produce the desired modification of the movement.

For cutting bevel gears the workpiece is usually mounted on a support or head which may be inclined by the required angle. In the machine according to this invention the longitudinal feed is controlled from the machine bed while the radial feed is controlled from the slide. By means of the said electrical transmission, the feeding movements may be synchronized in a simple way or adjusted to a determined ratio by means of exchangeable gears. Consequently, for cutting bevel gears it is sufficient to select the said ratio in accordance with the angle of the bevel gear to be cut, whereby the use of an inclinable support or head for the workpiece to be cut is avoided.

The invention will now be explained in detail with reference to the accompanying drawings wherein:

FIG. 3 is a circuit diagram for explanation of the operation of the electric transmission.

Figure 1:
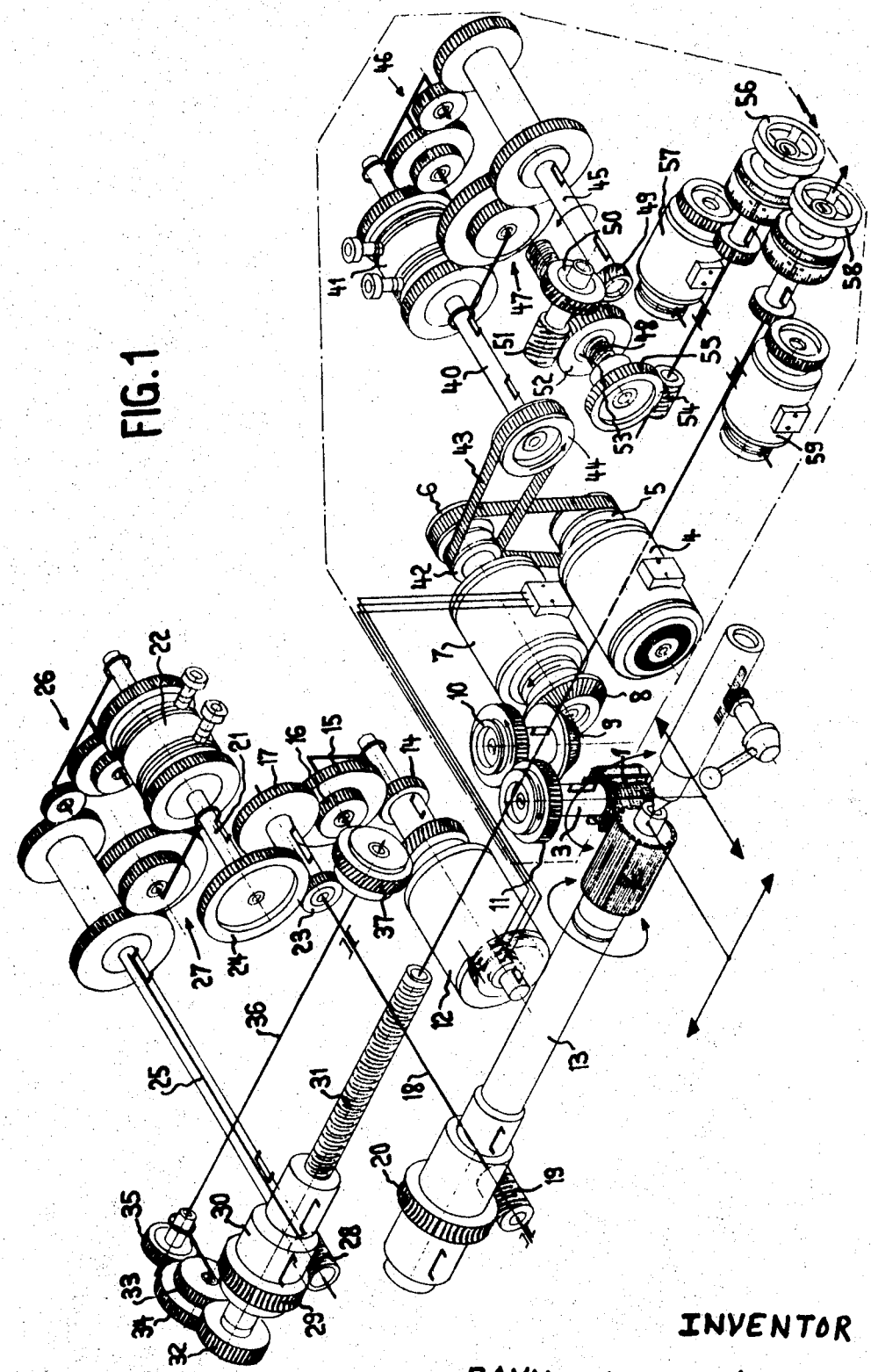
FIG. 1 is a schematical view of the mechanism of the machine.

The illustrated machine comprises a hob 1 suitable for hobbing a gear 2 in a manner well known per se. The hob 1 is fixed on a hob arbor 3 driven by a conventional driving motor 4 through exchangeable wheels 5 and 6 for selecting the desired speed, the rotor of a three-phase asynchronous slipring motor 7 and gears 8 to 11. The stator winding of motor 7 and the stator winding of a second three-phase asynchronous slipring motor 12 of similar electrical characteristics are connected to the three-phase mains. The rotor windings of motors 7 and 12 are connected to each other through their sliprings, whereby the rotors of motors 7 and 12 are electrically synchronized and constitute an electrical arbor or transmission.

The rotor of motor 12 drives the work arbor 13 through a gear train 14 to 17, a shaft 18, a worm 19 and a worm wheel 20. Through shaft 18 and gears 23 and 24 the motor 12 also actuates the driving shaft 21 of a magnetic coupling 22. By selective engagement and disengagement of the two parts of coupling 22 a shaft 25 may alternatively be driven in the one or other direction through gear transmissions 26 and 27 respectively. A worm 28 is fixed on shaft 25, this worm 28 meshing with a gear 29 of a nut 30 of a spindle 31 for the longitudinal feed of the hob slide. The spindle 31 is rotatatively mounted in the hob slide, but is secured therein against axial displacement.

Figure 2:
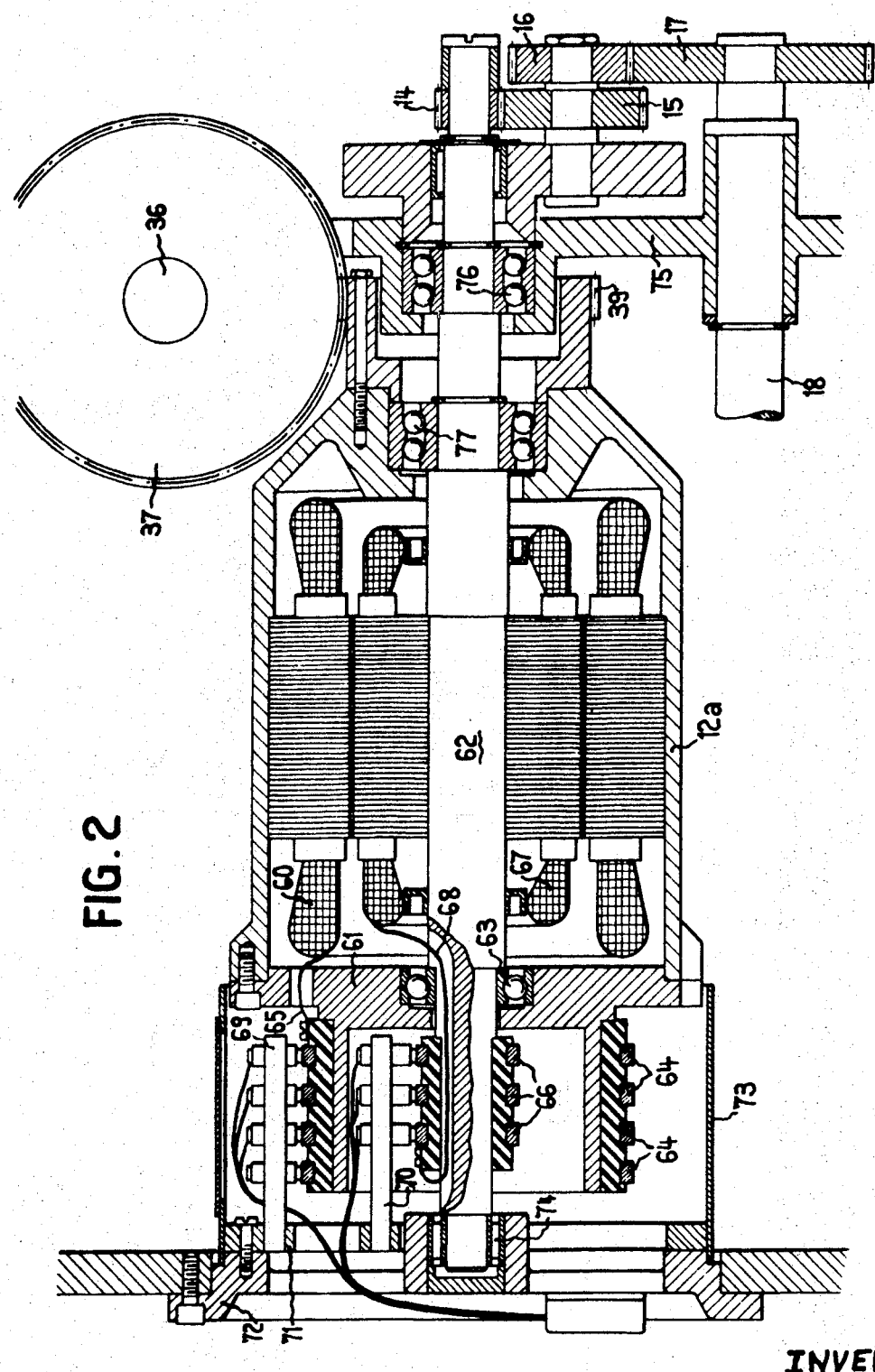
FIG. 2 is an axial section of a special motor included in the electrical transmission and having a rotatable stator, for cutting helical gears.

The nut 30 carries a gear 32 meshing with a gear transmission 33 to 35 for driving a shaft 36. Fixed on this shaft 36 is a helical gear 37 meshing with another helical gear 38 fixed on the stator of motor 12. This stator is rotatatively mounted as shown in FIG. 2 and explained below.

On the hob slide the driving shaft 40 of a magnetic coupling 41 is driven by motor 4 through wheel 42 fixed on the shaft of motor 7, a toothed belt 43 and a wheel 44. Coupling 41 allows selective driving of a shaft 45 in the one or other direction through gears 46 and 47. Shaft 45 drives the nut 53 of a spindle 58 for radial feeding through gears 49 and 50, a worm 51 and a worm gear 52. Gear 52 is fixed on the nut 53 of the feed spindle 48 which is mounted rotatively but is axially secured in the upper portion of the hob slide. A gear 55 is mounted on the feed spindle 48 which is axially secured in the lower portion of the hob slide. This gear 55 may be driven by means of a hand wheel 56 or a servomotor 57 through a worm 54. Similarly, the longitudinal-feed spindle 31 may be driven by means of a hand wheel 58 or a servomotor 59.

The hob slide, which is an element well known per se, is not shown in FIG. 1, but the machine elements mounted on this slide are shown within a dash-dotted line in FIG. 1. The most important of these elements are the hob 1, the motor 7 of the electrical transmission, the driving motor 4, the radial-feed mechanism with the magnetic coupling 41, the actuating means for the feed spindle 48 and the hand wheels 56 and 58 and servomotors 57 and 59.

FIG. 3 is a schematic circuit diagram of the important elements of the electrical transmission. Commutator 78 serves for connection of the machine to the mains with any desired phase sequence so that driving motor 4 and the rotors of motors 7 and 12 may be driven in both directions. When the rotating direction of motor 4 and consequently of the rotors of motors 7 and 12 is reversed, it is necessary to change also the rotating direction of the stator fields of motors 7 and 12 in such a way that the rotating direction of the stator fields is always opposite to the mechanical rotating direction of the rotors of motors 7 and 12. In this manner an efficient and accurate synchronization at a high pullout torque of the movement of both rotors of motors 7 and 12 is obtained for a wide range of speeds because the frequency induced in the rotor windings of motors 7 and 12 will always be above mains frequency. When switch 79 is closed contactor 80 connects two phases to motors 7 and 12 in order that the positions of the rotors of these motors be the same at each end of the electric transmission. A time relay T operates contactor 81 and thus connects the third phase to motors 7 and 12 with a certain delay, whereafter the machine is ready to operate like a classical machine with a mechanical synchronizing transmission between the hob arbor and the work arbor, contactors 80 and 81 remaining always closed.

Switch 82 serves for starting the machine by closing contactor 83 through which the driving motor 4 is energized and mechanically drives motor 7 of the electric transmission through wheels 5 and 6. In order to avoid too high acceleration by which the electric transmission might be broken, resistors 84 are connected into the circuit of motor 4 and are shortcircuited after a certain delay time by contactor 85 controlled by a time relay T. Commutator 86 is only used when the circuit is deenergized for reversing the rotating direction of motor 12 of the electric transmission relatively to the rotating direction of motor 7. Thermic protecting releasers 87 and 88 are connected into the lines of motors 7 and 12 of the electric transmission and of the driving motor 4 respectively, such releasers acting onto the contactor 83 for cutting the same under overcurrent conditions.

The illustrated machine operates as follows:

The hob is driven at the selected speed by the driving motor 4. The rotors of motors 7 and 12 rotate in phase and in synchronism such that any variations of speed of the hob due to cutting forces as an example, are transmitted in a fixed ratio to the rotor of motor 12 and consequently to the workpiece 2. A fixed relation is thus always maintained between the movement of the hob and the movement of the work, this being an indispensible condition in gear hobbing. The longitudinal and radial feed is automatically obtained in the desired relation by rotation of nuts 30 and 53 of the feed spindles 31 and 48.

In the illustrated embodiment the hob 1 is directly driven by the driving motor 4 by mechanical means, while the electric transmission comprising motors 7 and 12 only transmits the energy necessary for driving the workpiece 2 and the feed spindle 31. Thus, the majority of the energy is directly transmitted by mechanical means from the driving motor to the hob 1. On the other hand the energy to be transmitted through the electric transmission is relatively limited so that it is possible to use motors 7 and 12 of relatively small size and power rating.

For cutting gears with straight teeth as shown in FIG. 1 the gear transmission 32 to 35 is disengaged and the shaft 36 with the stator of motor 12 are locked. For cutting helical gears, gears 33 to 35 are engaged to gear 32 and determine by their transmission ratio the spiral angle of the helical gear to be cut. By rotation of the stator of motor 12 in the same direction as its rotor, the movement of gear 14 is accelerated, and when the stator rotates in opposite direction, the movement of gear 14 is slowed down in the proportion desired for cutting the helical gear.

The electrical transmission comprising motors or inductors 7 and 12 not only serves for synchronization of the rotating movements of hob 1 and work 2, but also for synchronizing the rotation of nuts 30 and 53 and consequently of the displacement of the feed spindles 31 and 48. These nuts are driven by the opposite ends of the electric transmission, that is, nut 30 is driven from the rotor of motor 12 while nut 53 is driven from the rotor of motor 7. It is thus possible to exactly coordinate the longitudinal and radial feed speeds, for instance for cutting bevel gears. For this machining operation the hob slide is simultaneously advanced in longitudinal and radial direction in order to displace the cutter in the direction of a generating line of the bevel gear to be cut.

It is self-explanatory that during hobbing of any type of gear the strokes of the hob slide in longitudinal and radial direction are limited and controlled for instance by means of end switches. These switches are not illustrated and need no further explanation because their use and operation are well known in the art.

FIG. 2 illustrates an embodiment of motor 12 with a rotatable stator. This motor has a casing 12a wherein the stator winding 60 is accommodated. The one end of the casing 12a is supported by a flange 61 in which the shaft 62 of the motor is mounted by means of a bearing 63. The flange 61 also supports four sliprings 64 connected to the stator winding by means of wires 65. Inside the sliprings 64 three sliprings 66 connected to rotor winding 67 by means of wires 68 are mounted on the motor shaft 62. The brush yokes 69 and 70 are fixed on an annular support 71 screw-fixed to the cover 72. A cylindrical metal sheet casing 73 connected to the cover 72 protects the brushes and sliprings of the motor.

One end of the shaft 62 of the motor is pivoted in the cover 72 by means of a bearing 74. The other end of shaft 62 is pivoted in a support 75 by means of a bearing 76. A pinion 14 meshing with the gear transmission 15, 16, 17 as shown in FIG. 1 is fixed on the motor shaft 62.

A helical gear 39 meshing with the helical gear 37 as illustrated in FIG. 1 is fixed at the one end of casing 12a. The end of the casing 12a carrying the gear 39 is pivoted on the motor shaft 62 by means of a bearing 77.

The structure shown in FIG. 2 allows independent rotation of the stator and rotor of motor 12, the rotor being pivotably mounted in stationary portions while the stator is pivotably mounted on the rotor. The stator winding and rotor winding are connected to the other portions of the circuit by means of sliprings 64 and 66 and brushes.

Various modifications of the machine as illustrated and described above are feasible. It was implicitly admitted that motors 7 and 12 have the same number of poles so that the rotors of such motors rotate at the same speed. However, different numbers of poles may be provided in these motors. Usually it would be desirable to provide a higher number of poles in motor 12 whereby the transmission ratio between the rotor of this motor and the workpiece may be reduced. When the machine is exclusively used for cutting straight gears it is unnecessary to provide a construction as shown in FIG. 2, that is, a motor 12 with a stationary stator may be used. The direction of energy transfer through the electrical transmission may be reversed, that is, the motor 12 may be driven by the driving motor 4 and the cutter may be driven through the electrical transmission. Under particular circumstances, where high but relatively constant power is required at both ends of the electrical transmission, driving motors may be provided at each end of the electrical transmission which only serves for synchronizing both driving systems. For practical reasons the stator windings of motors 7 and 12 are normally connected to the mains, while the rotor windings are connected to each other. However, it is equally possible to connect the rotor windings to the mains and to interconnect the stator windings.

I claim:

1. A gear hobbing machine including a hob arbor, a work arbor, gear mechanism connected with said work arbor, an electrical synchronizing transmission between the hob arbor and the gear mechanism of the work arbor, said transmission comprising two three-phase slipring motors, one of said motors being drivingly connected to said hob arbor, the other of said motors being drivingly connected to said work arbor, said motors each having a first three-phase winding adapted to be connected to three-phase mains for producing a field rotating in a predetermined direction, second windings of each of said slipring motors being electrically connected to each other, driving motor means adapted to be connected to three-phase mains and drivingly connected to at least one of said slipring motors and adapted to deliver the driving power for the machine, said slipring motors each being driven by said driving motor means in directions opposite to the rotating direction of the fields thereof and being positively synchronized in operation by said electrically interconnected second windings.

2. A machine according to claim 1, including a feed gear mechanism and wherein one of said slipring motors has a rotatable stator having a winding adapted to be connected to three-phase mains, said stator being drivingly connected with said feed gear mechanism, whereby cutting of helical gears is obtained by changing the speed of the work in accordance with the feed gear mechanism.

3. A machine according to claim 1, comprising one driving motor mechanically coupled to the hob arbor and to one of said slipring motors, the second slipring motor being coupled to the work arbor.

4. A machine according to claim 3, including a hob slide, and wherein said driving motor and said one slipring motor are mounted on the hob slide.

5. A machine according to claim 1 including a hob slide, a longitudinal feed mechanism for said hob slide and a radial feed mechanism for said hob slide, and wherein one of said slipring motors is coupled to and controls the longitudinal feed mechanism while the other of said slipring motors is coupled to and controls the radial feed mechanism.

6. A machine according to claim 1, comprising slipring motors having different numbers of poles such that these slipring motors constituting opposite ends of the electrical synchronizing transmission rotate at different speeds.

7. The use of the machine according to claim 5 for cutting bevel gears, whereby the feeding speeds of the hob slide in longitudinal and radial direction are controlled each from one of said slipring motors in order to move the work in the direction of a generating line of the bevel gear.

8. A gear hobbing machine including a hob arbor, a work arbor, gear mechanism connected with said work arbor, an electrical synchronizing transmission between the hob arbor and the gear mechanism of the work arbor, said transmission comprising two three-phase slipring motors, one of said motors being drivingly connected to said hob arbor, the other of said motors being drivingly connected to said work arbor, said motors each having a stator three-phase winding adapted to be connected to three-phase mains for producing a field rotating in a predetermined direction, each of said motors including a rotor winding, said rotor windings being electrically connected to each other, driving motor means for driving the rotor of at least one of said slipring motors and adapted to deliver the driving power for the machine whereby said slipring motors are positively synchronized in operation by said rotating field and said electrically interconnected rotor windings, and a feed gear mechanism, one of said slipring motors having a rotatable stator being drivingly connected with said feed gear mechanism whereby cutting of helical gears is obtained by changing the speed of the work in accordance with the speed of the feed gear mechanism.